CORRECTION OF ERRORS IN PULSE CODE COMMUNICATION

Filed Dec. 3, 1947

INVENTOR
E. PETERSON
BY Harry C. Hart
ATTORNEY

Patented July 25, 1950 2,516,587

UNITED STATES PATENT OFFICE 2,516,587

CORRECTION OF ERRORS IN PULSE CODE COMMUNICATION

Eugene Peterson, New York, N. Y., assignor to Bell Telephone Laboratories, Incorporated, New York, N. Y., a corporation of New York Application December 3, 1947, Serial No. 789,345

8 Claims. (Cl. 179—1.5)

This invention relates to electrical communication, and particularly to communication by pulse techniques. Its general objects are to improve the fidelity and quality of a reproduced message.

While broadly applicable to communication systems generally, it is especially well adapted to pulse code transmission systems, and will be described as embodied in such a system.

In pulse code transmission, the amplitudes of a message wave to be transmitted are sampled at successive instants which are equally spaced in time. Each of these amplitude samples is then translated into a group of on-or-off pulses termed a code pulse group. A convenient code for this purpose is the 7-digit binary code. Any binary code is capable of representing $2^n$ discrete values where $n$ is the number of digits in the code. For example, with the 7-digit binary code, $2^7$ or 128 different values can be represented. Thus each signal sample, which may have any amplitude of a continuous range from a preassigned negative maximum, through zero to a preassigned positive maximum is translated, in the 7-digit binary code, into the nearest one of 128 different values. This process is termed "quantization," and its effect on the signal is known as "granularity" which, when the signal is reproduced, appears as background noise. Each different quantized value is translated into a unique code pulse group for transmission. At the receiver station the received signal in the form of successive code pulse groups is translated or "decoded" into successive quantized amplitude values out of which the message signal is reconstructed.

The quantization process, which is essential to the coding process, offers marked advantages in transmission because of the fact that substantially perfect regeneration can be carried out at the receiver station prior to decoding or at one or more repeater stations located between the transmitter station and the receiver station. Thus, when regeneration is employed, the only significant noise and distortion associated with the signal at the receiver are the noise and distortion which were contributed by the transmitter apparatus.

On the other hand the quantization process possesses a certain disadvantage in that the granularity introduced by quantization of the signal at the transmitter is never removed in the decoding or translating process at the receiver but remains associated with the decoded signal as a background of noise.

It is a specific object of the invention to reduce the background granularity noise which is due to the quantization of the signal at the transmitter.

Clearly the granularity due to quantization of the signal can in theory be reduced to any desired minimum by indefinitely increasing the number of steps in the quantization process. In pulse code transmission, this means an indefinite increase in the number of digits of the code. As a practical matter, however, it is impossible to increase the number of digits in the code without increasing the size and complexity of the coding apparatus to fantastic proportions. Consider, by way of example, the pulse code transmission system in which a coder tube is employed of the type described in the Bell System Technical Journal, January 1948, the articles entitled An Experimental Multichannel Pulse Code Modulation System of Toll Quality—L. A. Meacham and E. Peterson, pages 1 to 43, and Electron Beam Deflection Tube for Pulse Code Modulation, by R. W. Sears, pages 44 to 57. Briefly, the coder of that publication comprises a cathode beam tube having a collector anode toward which the cathode beam is projected and, interposed in the path of the beam, a coding mask comprising a plurality of apertures arranged in $n$ columns and $2^n$ rows, where $n$ is the number of digits in the code. In a specific example with which successful tests have been carried out, the number of digits is seven and the apertures are therefore arranged in seven columns and $2^7$ or 128 rows. Evidently, if the number of digits were increased to eight, the rows would be increased to $2^8$ or 256. For a given fineness of fabrication, this means substantially doubling the dimensions of the coding mask and therefore of the coder tube itself. Similarly, if the digits of the code were increased to 9, the aperture rows would number $2^9$ or 512, resulting in a corresponding fourfold increase in the size of the coder tube.

It is therefore a more specific object of the invention to produce an effective increase in the number of code digits of a pulse code transmission system without a corresponding increase in the size or complexity of the coding apparatus.

In accordance with the invention, the message signal is sample, quantized and coded in the usual way, the resulting code pulse groups being transmitted to a receiver station, where they are decoded for reproduction. In addition, however, the pulse code groups so obtained at the transmitter are locally decoded at the transmitter to provide an uncoded signal which is a replica of the original message signal except for the fact that its amplitude increases in steps instead of continuously; i. e., it has been quantized. This quantized signal is now balanced against the original continuous signal to provide a "granularity error" signal. The latter is transmitted to the receiver station along with the principal code pulse group. This transmission may be carried out in any convenient manner, by pulse transmission or otherwise, but it is of advantage to transmit it similarly to the main signal, that is, by pulse code transmission. The error signal, therefore, is coded just as was the original message and the resulting code pulse groups are transmitted to the receiver over an auxiliary channel. There they are decoded and added to the decoded output of the principal decoder. As a result of this process, the granularity and resulting background noise of the signal as finally reproduced are greatly reduced.

Because of the operation of the system as described in the foregoing paragraph, the system may be termed a "vernier" transmission system.

It is an important further feature of the invention that, when the characteristics of certain apparatus elements are matched in a manner to be described, there results, in addition to reduction of the granularity, a substantial reduction of any other errors which may be inherent in the coding and decoding processes.

The invention will be fully apprehended from the following detailed description of preferred embodiments thereof taken in conjunction with the appended drawings in which.

Figure 1:
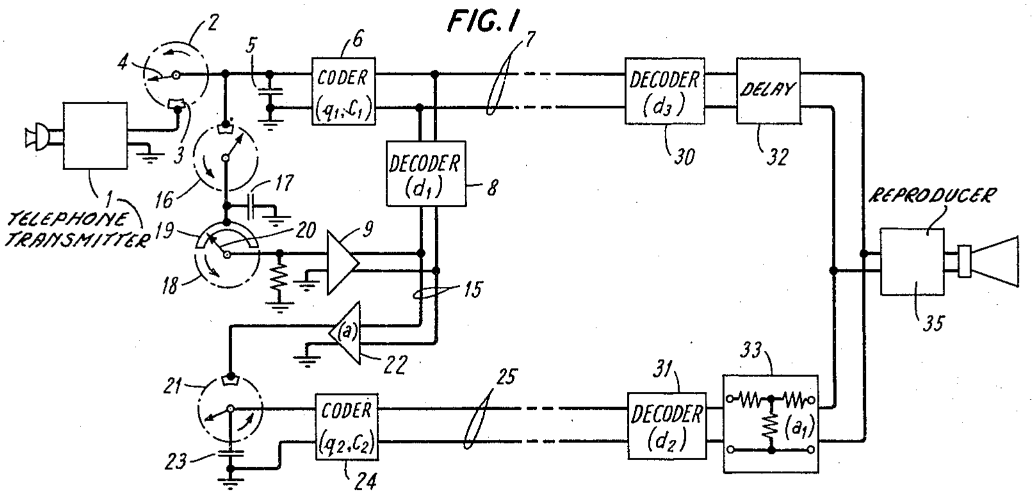
Fig. 1 is a schematic block diagram of a transmission system in accordance with the invention in one of its embodiments.

Referring now to the drawings, Fig. 1 shows a pulse code transmission system including both transmitter and receiver. A message to be transmitted, which may originate, for example, at a telephone transmitter 1, is repeatedly sampled by a distributor 2. Each sample is held at a substantially constant value by a condenser 5 or other holding circuit until the arrival of the following sample. During the interval in which the sample is held, it is translated into a code pulse group by a coder 6, and the resulting code pulse group is then transmitted to a receiver station over a transmission path 7. Each code pulse group represents the corresponding sample only to the nearest one of a restricted number of discrete values; for example, with the 7-digit code, to the nearest one of 128 different discrete values. Thus it is "quantized." Before transmission, the output of the coder 6 may be regenerated as desired and transmission may be carried out by wire or by radio or by any desired means, such apparatus not being a part of the present invention.

At the same time, at the transmitter station, each code pulse group is decoded by a decoder 8 whose output is therefore a replica of the original message, as sampled by the distributor 2 and held by the condenser 5, except for the fact that it has been quantized. This quantized message is now balanced against the original signal. As a simple balancing device, the original signal is reversed in polarity and adjusted in gain for proper balance as by an amplifier 9 and added to the quantized signal. Correct balance is achieved by adjustment of the gain of the amplifier until the residual signal appearing on conductors 15 is a minimum. This residual signal is an error signal which, in the absence of errors in the operation of the coder and the decoder, represents only the granularity due to the quantization process.

Because the coding and decoding processes require time, the resulting quantized signal is delayed with respect to the original signal. To compensate for this delay a like delay is introduced in the comparison path by suitable delay apparatus. The construction and use of electrical transmission lines to delay signals by a preassigned time interval is well known. The length of such a line, to introduce a required time delay, is equal to the product of the time delay by the wave propagation speed of the line. By proper construction, the wave propagation speeds of such lines may be reduced to as little as one-tenth per cent of the propagation velocity of electromagnetic waves in free space. Even so, the length of such a device may reach excessive proportions if the combined delays of the coder 6 and of the decoder 8 are substantial. Therefore, while any suitable delay device may, of course, be employed, it is preferred to utilize successive sampling circuits. Thus in Fig. 1, each of the original signal samples obtained by the distributor 2 is in turn sampled, while it is being held by the condenser 5 and before the occurrence of the next sample, by a second distributor 16 whose output samples are in turn held by a second condenser 17. Each of these "second order" samples is in turn sampled by a third distributor 18. These are not held by any particular holding circuit but are arranged by adjustment of the length of the distributor segment 19 to occupy one-half the sampling period or slightly less. By proper adjustment of the phases of the rotating arms of the distributors 2, 16, 18, it is possible to delay the last sample by as much as one and one-half sample periods so that it coincides both in operation and in time of occurrence with a sample output of the decoder 8 which has been delayed by the coding and decoding process to an equally large extent, and this without altering the actual sample wave form. By further multiplication of these sequential samplers the original signal samples may be delayed in time to any desired extent, so that, for example, the granularity error signal corresponding to the first original signal sample occurs following a much later signal sample, for example, the 9th or the 10th. Likewise, by adjustment of the phase of the rotating arm of the last sampler 18 with respect to that of the prior sampler 16 the resulting granularity error signal sample may be caused to occur exactly mid-way between one original signal sample and the next one.

While shown as simple mechanical commutators for the sake of illustration, it is to be understood that the various samplers may be of electronic type, for example, they may be double diode switches as shown in "Precision Circuit Techniques" by Britton Chance, Review of Scientific Instruments, vol. 17, pages 396, 408, October 1946. For holding, a condenser is connected to the output. For sampling without holding, the condenser may be replaced by a resistor. In either case, the gating pulses required for operation of the various electronic switches may be derived from a multivibrator, a ring circuit, a chain circuit, or the like. When delay is required between the operation of one sampler and that of the next one, operating pulses may conveniently be drawn from the successive stages of a ring circuit.

Figure 3:
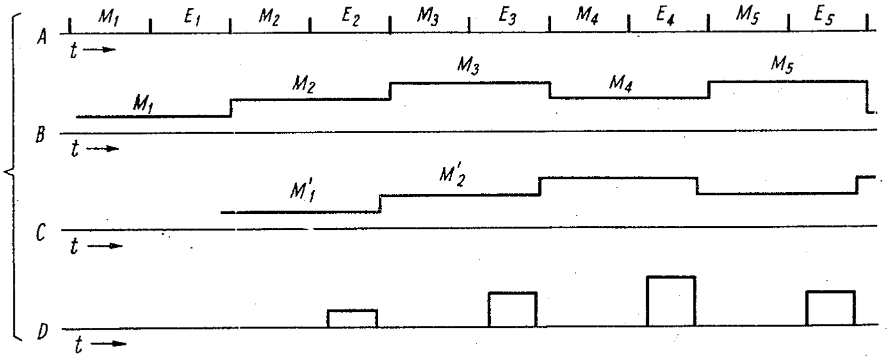
Fig. 3 is a wave form diagram of assistance in connection with the description of Figs. 1 and 2.

The operation of the successive samplers is further illustrated in Fig. 3 wherein successive sampling intervals indicated by $M_1$, $E_1$, $M_2$, $E_2$, $M_3$, etc. of curve A are assigned to successive main signal samples and to error signal samples, respectively, interlaced on a time division basis. In curve B the first sample $M_1$ of the main signal is initiated by the distributor 2 at the moment its arm 4 makes contact with its segment 3 and is held by the condenser 5 for the full sampling period, whereupon a new sample, $M_2$, is initiated and similarly held, and so on. Before the termination of the held sample $M_1$, it is in turn sampled by the distributor 16 and held by the condenser 17 for a full sampling period as $M_1'$ of curve C. Similarly, before the termination of the held sample $M_2$, it too is sampled and the sample $M_2'$ is held for a full sampling period. It will be observed that there is a substantial overlap in time between the sample $M_1'$ and the error sample period $E_2$ and a similar overlap between the sample $M_2'$ and the error sample period $E_3$. These samples may therefor be in turn sampled without holding and at times which coincide in time of occurrence and in duration with error signal periods as indicated in curve D. This coincidence is not necessary in the system of Fig. 1. It is important, however, that the original signal samples match the quantized signal samples both in time of occurrence and in duration.

The error signal appears on the conductor 15 which is connected to a sampling distributor 21 which is driven at the same rate and in correct phase relation with the original message distributor 2. An amplifier 22 is included in the path 15 in order to build up the amplitude of error signal by a suitable factor such as 30 or 40 to 1. The distributor 21 samples the amplified error signal and each sample is held as by a condenser 23, until the arrival of the next sample. While it is held it is coded by a coder 24 which may be similar to the main channel coder and delivered as a sequence of code pulse groups to an auxiliary transmission channel 25. As before, suitable regeneration, amplification, modulation and transmission apparatus, forming no part of the present invention, are omitted from the drawing but may be included in the system as desired.

At the receiver, the code pulse groups of the main channel 7, after demodulation, regeneration and amplification as required, are applied to a decoder 30. Its output is in the form of quantized main signal samples. At the same time the pulse code groups of the auxiliary channel 25 are decoded by an auxiliary decoder 31 whose output is likewise in the form of quantized error signal samples. The main channel samples are then delayed by a delay device 32 to bring each one of them into time coincidence with the corresponding one of the error signal samples, while the latter are attenuated by an attenuator 33 to reduce their values by the correct amount, namely by the amount of the amplification by the amplifier 22 at the transmitter station.

The output of the attenuator 33 is now in the form of a sequence of minutely quantized small signals which afford correction to compensate for the quantization of the main channel signals. The main channel signals and the auxiliary channel signals are now added by feeding them together to a reproducer 35 which delivers a message which is a substantial replica of the original message at the transmitter.

The two decoders 30 and 31 at the receiver station and the decoder 8 at the transmitter station should be alike in performance and are preferably alike in structure. A suitable decoder comprises a resistor and a condenser connected in parallel, and means for applying to the condenser an identical increment of charge upon arrival of each code pulse. The values of the resistance and capacitance are such that, during any single pulse interval, whatever charge is on the condenser decays to precisely half its value. Thus the charge remaining at the conclusion of each code pulse group consists of contributions from all of the pulses of the group, weighted in a binary manner. The decoder includes a sampling circuit which measures and stores the decoded potential which is fleetingly present at a regularly recurring instant following the final pulse position of each group. Circuit details and performance of this decoder are described in the Bell System Technical Journal for January 1948, at pages 36 to 40. It is assumed that all of these decoders are operated at the pulse group frequency, and that each is in the correct phase to collect all of the pulses of a single code pulse group and translate them and only them into an output amplitude value. Synchronization of the decoders 30, 31 at the receiver with the transmitter apparatus may be carried out by signals transmitted over an auxiliary pilot channel, by marker pulses interlaced with the code group pulses either of the main channel or of the error channel, or in any desired manner.

It is inherent in the nature of the quantization process that the maximum value of the granularity error signal be one half step, positive or negative. This maximum value occurs when the signal sample amplitude lies midway between two adjacent steps. Lesser granularity errors occur when the sample amplitude lies less than one-half step from the nearest quantized value. This is true no matter what may be the total number of available steps. For example, with the 128 steps of the 7-digit code, a positive sample of maximum amplitude deflects the coder tube beam to its full extent in the upward direction, which is 64 steps removed from the center of the coding mask, the zero signal position. If, now, the granularity error signal be built up before coding by amplification by a factor 128, the maximum granularity error signals will produce beam deflections to the full extent of the code mask and these, in turn, will be broken down by the vernier process of the invention into 128 different quantized values. At the receiver, the error signals in the auxiliary channel are attenuated by the same factor 128, the magnitude of each of its steps being correspondingly reduced. As a result the granularity of the signal as a whole has been reduced by a factor $2^7$ and the back ground noise is at the level which would obtain with straightforward single path transmission using 14 digits instead of 7.

The above holds when the coder itself is free of errors. It may happen, however, that the original deflection of the coder beam is in error, for example by the width of one aperture row. In this event the difference between the original signal and the quantized output of the local decoder 8 is one and one half steps, of which one half step is chargeable to quantization and one whole step to incorrect coding. If this difference signal were to be amplified by a factor 128, the coder beam would be deflected well beyond the last aperture row of the mask.

To guard against this possibility, it is preferred to amplify the error signal by a factor of about 30–40, and to attenuate the corresponding decoded error samples at the receiver by the same amount. Thus, if the amplification factor at the transmitter were 32, the maximum granularity error would cause a beam deflection one quarter way to the upper or lower end of the mask, while the combined effect of this graularity error and a one step coding error would cause a deflection three quarters of the way to the same point. In effect, this is equivalent to sacrificing one or two digits of the possible seven of the error pulse code to correct for coding errors as distinct from granularity errors. In particular, if the main channel code is of $n$ digits, it is preferred to translate the error signal into a code of $m$ digits where $m$ is less than $n$.

The vernier system of the invention corrects for errors of the coder. Furthermore, when the main channel decoders 8 and 30 are alike, the system also corrects for the decoder errors. This will be seen from the following analysis:

Referring to Fig. 1, let $q_1$=quantization error in main channel
$q_2$=quantization error in auxiliary channel
$c_1$=coding error in main channel
$d_1$=local decoding error at transmitter
$c_2$=coding error in auxiliary channel
$d_2$=decoding error at receiver in auxiliary channel
$d_3$=decoding error at receiver in main channel
$a$=amplification factor for error signal at transmitter
$\frac{1}{a_1}$=attenuation factor for error signal at receiver.

Then the error in the main signal path is evidently $$E_m=q_1+c_1+d_3$$

and the error in the auxiliary path is $$E_a=\frac{a}{a_1}(q_1+c_1+d_1)+\frac{q_2+c_2+d_2}{a_1}$$

The total error of the system is the difference between these errors or $$E=-E_m+E_a$$

Making the assumption that (a) $a_1=a$, or receiver attenuation is equal to transmitter amplification in the error path;
(b) $d_3=d_1$; the main path decoders are identical;
(c) $q_2=q_1=q$; the quantization errors in the main and auxiliary paths are equal;

this becomes $$E=-E_m+E_a=\frac{q}{a}+\frac{c_2+d_2}{a}$$

It will be observed that the main channel coding error ($c_1$) has vanished identically; that the main channel decoding error $d_3$ has been cancelled by the error $d_1$ of the auxiliary decoder at the transmitter; that the quantization error has been reduced by the factor $a$; and that these improvements have been obtained at the negligible cost of the addition of the term $$\frac{c_2+d_2}{a}$$

the sum of the auxiliary channel coding and decoding errors, reduced by the factor $a$.

Figure 2:
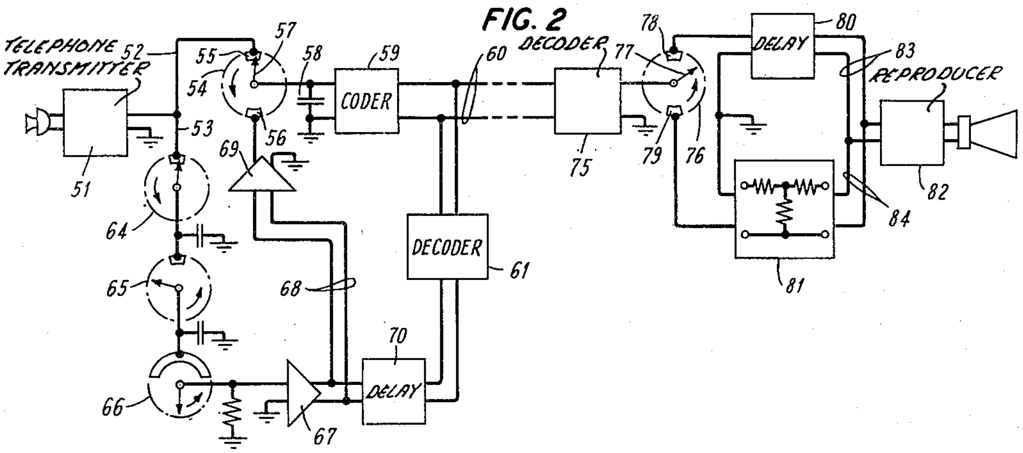
Fig. 2 is a schematic block diagram of a system alternative to that of Fig. 1.

Fig. 2 shows a modification of Fig. 1 in which the code pulse groups of the main channel are interlaced with the code pulse groups of the granularity error channel on a time division basis, thus utilizing only one transmission path between the transmitter and receiver instead of two as in the case of Fig. 1. This economy of transmission paths places one further requirement on the apparatus of Fig. 2, namely, that the error signal samples be correctly interlaced on a time division basis between adjacent main signal samples, in the manner shown in Fig. 3 and described in connection therewith. Thus a message originating in the transmitter 51 is conducted over two paths 52, 53 and to two oppositely placed segments 55, 56 of a distributor 54 whose rotating arm 57 is connected to a holding circuit such as a condenser 58. With the arm 57 rotating at constant speed, it thus places on the holding circuit samples of the message waves on the upper segment 55 in alternation with samples of whatever signal may appear on the lower segment 56. Each successive sample is held by the condenser 58 until the arrival of the following sample. While so held it is translated into a code pulse group by the coder 59 and transmitted over a path 60 in the same manner as in Fig. 1. At the same time the output of the coder 59 is translated by a local decoder 61 into a quantized and delayed replica of the original message signal. This is balanced against the original message signal in the same manner as in Fig. 1, through the medium of a delaying sampler sequence 64, 65, 66 which brings the original message signal into time coincidence with the quantized replica and an amplifier 67 which reverses its polarity and adjusts its magnitude for balance. The delayed and reversed original signal is then added to the quantized signal to provide an error signal, which appears on conductors 68. The latter is built up to a sizable amplitude level as in Fig. 1 by an amplifier 69 and applied to the lower segment 56 of the distributor 54.

The error signal must arrive at the lower distributor segment 56 at the time at which the rotating arm 57 sweeps this segment, in order that proper interlacing of the error signal with the main signal may take place. The sum of the time delays due to the coding and decoding processes may not add up to exactly the right amount to produce this result. Therefore, to insure this result, an auxiliary delay device 70 is added in the path of the quantized signal and the delay of the sampler sequence 64, 65, 66 is increased correspondingly so that the difference between the delays of the sampler sequence and of the auxiliary device 70 is equal to the total delay of the coder 59 and the decoder 61, while the sum of the delays of the coder 59, the decoder 61 and the auxiliary delay device 70 is equal to an odd number of half periods of the distributor 54. This situation is illustrated in Fig. 3.

The interlaced code pulses are now transmitted to a receiver station as before, regeneration, amplification, modulation into a carrier and the like being carried out in the manner and to the extent desired. At the receiver station after corresponding demodulation, regeneration and amplification, they are applied to a decoder 75 which may be of the type shown in the article in the Bell System Technical Journal at pages 36 to 40, above referred to. The decoded output is now applied to a 2-segment distributor 76 which may be similar to the distributor 54 at the transmitter station and which is assumed to be operated in synchronism therewith. One of the segments of this distributor is connected to a delay device 80 and the other to an attenuator 81. The phase of the receiver-distributor arm 77 is adjusted so that the main channel quantized samples are applied to the upper segment 78 and the quantized samples of the granularity error are applied to the lower segment 79. The decoded output now consists of a succession of amplitude samples, alternate ones being amplitude samples of the main signal and those between being amplitude samples of the error signal, amplified by the amplifier 69. The main channel samples are then delayed by the delay device 80 to bring them into time coincidence with the corresponding error samples, while the latter are attenuated by the attenuator 81 to remove the amplification contributed by the amplifier 69 at the transmitter. The outputs of these two devices are now added as before and applied to a message reproducer 82 by way of conductors 83, 84. The input to this reproducer 82 from the upper conductors 83 is in the form of the original signal but quantized, while the input from the lower conductors 84 is in the form of corrections for this quantization.

The error analysis which has been given for Fig. 1 applies equally to Fig. 2.

In the apparatus of Fig. 1, if care be exercised to assure that the code pulse groups of the error signal occur evenly interlaced on a time division basis with the code pulse groups of the main channel, they may be transmitted over a single path and receiver apparatus as shown in Fig. 2 may be employed to decode them and reconstruct the message signal.

While described in connection with a pulse code transmission system, in which quantization is inherent, and in which the granularity error is reduced and the coding and decoding errors are eliminated, the invention is applicable as well to systems of other types. For example, it may be applied to a carrier transmission system to correct for errors of the modulator and demodulator. In this case the modulated output is transmitted to a receiver station but is also locally demodulated at the transmitter, and the demodulated signal is compared with the original signal to provide a modulator-error signal. The latter is amplified, modulated, and transmitted to the receiver station on an auxiliary channel. There it is attenuated and demodulated, and added to the main signal in proper phase to compensate for errors in the transmitter modulator and the receiver demodulator.

With appropriate changes in the significance of the symbols, the foregoing mathematical expression of the error reduction feature of the invention applies to this situation. It shows that any errors of the modulator are eliminated and, if the local demodulator at the transmitter and the main demodulator at the receiver are alike, the demodulated errors are eliminated as well.

Various other modifications will occur to those skilled in the art.

What is claimed is:

1. The combination which comprises means for deriving from a signal to be transmitted a regular sequence of substantially instantaneous signal samples, means for coding each sample of said sequence into a binary permutation code pulse group representing a particular one of a fixed number of discrete values, means for decoding said pulse group to obtain said discrete value, means for balancing each of said values against the original signal to derive an error signal representative of quantization and coding errors, means for deriving from said error signal a regular sequence of substantially instantaneous error signal samples, means for coding each of said error signal samples into another binary permutation code pulse group, means for transmitting both of the resulting sequences of code pulse groups to a receiver station, and at said receiver station, means for decoding each of said code pulse groups, and means for combining the resulting decoded value of each member of the first sequence with the resulting value of the corresponding member of the second sequence.

2. The combination which comprises means for deriving from a signal to be transmitted a regular sequence of substantially instantaneous signal samples, means for translating each sample of said sequence into a binary permutation code pulse group representing a particular one of a fixed number discrete values, means for decoding said pulse group to obtain said discrete value, means for balancing each of said values against the original signal to derive an error signal, means for coding said error signal into another code pulse group, means for transmitting both of said code pulse groups to a receiver station, and, at said receiver station, means for decoding each of said code pulse groups, and means for combining the resulting decoded values.

3. In a pulse code transmission system, means at a transmitter station for sampling a signal to obtain successive signal samples, means for coding each of said samples into a binary permutation code pulse group representing a particular one of a fixed number of discrete values, means for transmitting said code pulse groups to a receiver station, means at said transmitter station for locally decoding each of said code pulse groups to obtain the corresponding one of said discrete values, means for balancing each of said discrete values against the corresponding signal sample from which it was derived to obtain an error signal sample, means for coding each error signal sample into another code pulse group representing a particular one of a lesser number of values, means for transmitting said cole pulse groups to said receiver station, and at said receiver station, means for decoding said principal code pulse groups, means for decoding said error-signal code pulse groups, and means for combining the outputs of said decoding means to provide signal samples of reduced granularity.

4. In a transmission system in which successive signal amplitude samples are translated into code pulse groups prior to transmission and retranslated into amplitude samples by decoding means after reception at a receiver station, apparatus for compensating for errors in the coding and decoding processes which comprises local means for decoding the coded signal at the transmitter station, identical with the receiver station decoding means, means for balancing the original signal against the locally decoded signal to provide a difference signal representative of said errors, means for transmitting said difference signal to the receiver station, and means at said receiver station for adding said difference signal to the decoded main signal.

5. Transmission apparatus which comprises, in combination with a signal source, signal sampling means, coding means, and decoding means, connected in tandem in the order named, each of said means having input terminals and output terminals, time delay means having input terminals and output terminals, the input terminals of the time delay means being connected to the input terminals of the coding means, its output terminals being connected to the output terminals of the decoding means, an auxiliary sampling means connected to the last named junction point, auxiliary coding means fed by said sampling means, and a transmission path leading from each of said coding means for carrying code signals to a receiver station.

6. In a pulse code transmission apparatus, in combination with a source of signals, coding means for said signals, adapted to deliver a pulse code output, and decoding means connected together, said means being adapted to produce a delayed quantized replica of an original signal of the source, means for producing an equally delayed unquantized replica of said signal which comprises a plurality of signal sampling means connected in tandem, the first arranged to derive samples of the original signal, each of the others being connected to sample the output of its predecessor, means for balancing the output of the final sampling means against the output of the decoding means to derive an error signal, and means for transmitting the output of said coding means and said error signal to a receiver station.

7. In pulse transmission apparatus, in combination with a source of signals and signal quantizing means, said quantizing means being adapted to produce a delayed quantized replica of an original signal of the source, means for producing an equally delayed unquantized replica of said signal which comprises a plurality of signal sampling means connected in tandem, the first connected to derive samples of the original signal, each of the others being connected to sample the output of its predecessor, means for balancing the output of the final sampling means against the output of the quantizing means to derive an error signal, and means for transmitting the output of said quantizing means and said error signal to a receiver station.

8. Transmission apparatus which comprises, in combination with a signal source, signal sampling means having two input points which are operative in regular alternation and a common output point, a first one of said input points being connected to said source, coding means connected to said output point, decoding means connected in tandem to said coding means, said sampling means, coding means and decoding means defining a first signal path from the source to the output terminals of the decoding means, a second signal path from said source to the output terminals of said decoding means, a delay device in said second path, a third path from the junction point of said first and second paths to a second one of the input points of said sampling means, and an amplifier in said third path.

EUGENE PETERSON.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,313,209 | Valensi | Mar. 9, 1943 |
| 2,404,356 | Atkins | July 23, 1946 |
| 2,430,139 | Peterson | Nov. 4, 1947 |
| 2,437,707 | Pierce | Mar. 16, 1948 |
| 2,438,908 | Goodall | Apr. 6, 1948 |